United States Patent
Logvinov et al.

(10) Patent No.: US 11,794,603 B2
(45) Date of Patent: Oct. 24, 2023

(54) METHODS, DEVICES, AND SYSTEMS FOR SUBMETERING OF AN ELECTRIC VEHICLE (EV) CHARGING SESSION

(71) Applicant: IoTecha Corp., Cranbury, NJ (US)

(72) Inventors: Oleg Logvinov, Weston, CT (US); Michael J. Macaluso, Jackson, NJ (US)

(73) Assignee: IOTECHA CORP., Cranbury, NJ (US)

( * ) Notice: Subject to any disclaimer, the term of this patent is extended or adjusted under 35 U.S.C. 154(b) by 0 days.

(21) Appl. No.: 18/054,655

(22) Filed: Nov. 11, 2022

(65) Prior Publication Data

US 2023/0202339 A1 Jun. 29, 2023

Related U.S. Application Data

(60) Provisional application No. 63/279,345, filed on Nov. 15, 2021.

(51) Int. Cl.
*B60L 53/68* (2019.01)
*B60L 53/30* (2019.01)
(Continued)

(52) U.S. Cl.
CPC ............... *B60L 53/68* (2019.02); *B60L 53/16* (2019.02); *B60L 53/305* (2019.02); *B60L 53/665* (2019.02)

(58) Field of Classification Search
CPC ...... B60L 53/68; B60L 53/305; B60L 53/665; B60L 53/16
(Continued)

(56) References Cited

U.S. PATENT DOCUMENTS

| 11,554,683 | B2 * | 1/2023 | Cashdollar | ............... H02J 3/14 |
| 2011/0175569 | A1 * | 7/2011 | Austin | ................ B60L 53/305 |
| | | | | 320/109 |

(Continued)

FOREIGN PATENT DOCUMENTS

| CN | 105391104 B | 8/2020 |
| JP | 5859465 B2 | 2/2016 |

OTHER PUBLICATIONS

Directive 2004/22/EC of the European Parliament and of the Council of Mar. 31, 2004 on measuring instruments, Official Journal of the European Union, Apr. 30, 2004, pp. L 135/1-L 135/80.
(Continued)

*Primary Examiner* — Nathaniel R Pelton
(74) *Attorney, Agent, or Firm* — NK Patent Law (57) ABSTRACT

Disclosed herein are methods, devices, and systems for providing submetering of electric vehicle (EV) charging sessions. According to one embodiment, an apparatus includes a first connector configured for coupling with an EV charger, a second connector configured for coupling with a charging port of an EV, a communication interface, and a controller electrically coupled with the first connector. The controller is configured for detecting a beginning of the EV charging session, monitoring EV charging current and EV charging voltage during the EV charging session, detecting an end of the EV charging session, determining an amount of energy transferred during the EV charging session, and transmitting to a remote device a value representing the amount of energy transferred during the EV charging session.

20 Claims, 10 Drawing Sheets

(51) Int. Cl.
  *B60L 53/66* (2019.01)
  *B60L 53/16* (2019.01)
(58) Field of Classification Search
  USPC .......................................................... 320/109
  See application file for complete search history.

(56) References Cited

U.S. PATENT DOCUMENTS

2011/0202217 A1    8/2011  Kempton
2018/0189900 A1*  7/2018  Díaz ..................... B60L 53/665
2021/0331600 A1* 10/2021  Hishida ................... B60L 53/63
2022/0126728 A1*  4/2022  Zhang ..................... H04L 67/12

OTHER PUBLICATIONS

Elaadnl: "EV Related Protocol Study", Original Study Report Version I.I, Jan. 2017, 95 pages.
SHM Communications: "Mid Guide—Consultancy—Meters", 2011, 16 pages.
European Patent Office, Extended European Search Report for European Application No. 22207608.5-1211 dated Apr. 4, 2023, 10 pages.

* cited by examiner

METHODS, DEVICES, AND SYSTEMS FOR SUBMETERING OF AN ELECTRIC VEHICLE (EV) CHARGING SESSION

PRIORITY CLAIM

This application claims the benefit of U.S. Provisional Patent Application Ser. No. 63/279,345, titled "METHODS, DEVICES, AND SYSTEMS FOR SUBMETERING OF AN ELECTRIC VEHICLE (EV) CHARGING SESSION," filed Nov. 15, 2021, the entire contents of which are hereby incorporated herein by reference.

TECHNICAL FIELD

The present invention relates generally to the field of electric vehicle (EV) chargers. More particularly, methods, devices, and systems are disclosed for submetering of EV charging sessions.

BACKGROUND

With the growth of electric vehicles (EVs), users are installing home-based EV chargers for convenience. However, with the large amount of energy that a home-based EV charger draws, users are interested in submetering an EV charging session where reimbursement may be possible and/or for just better understanding of the energy they are using.

Accordingly, there remains a need for improved methods, devices, and systems for facilitating submetering of EV charging sessions.

SUMMARY

Disclosed herein are methods, devices, and systems for providing submetering of electric vehicle (EV) charging sessions.

According to one embodiment, an apparatus includes a first connector configured for coupling with an EV charger, a second connector configured for coupling with a charging port of an EV, a communication interface, and a controller electrically coupled with the first connector. The controller is configured for (1) detecting a beginning of the EV charging session, (2) monitoring EV charging current and EV charging voltage during the EV charging session, (3) detecting an end of the EV charging session, (4) determining an amount of energy transferred during the EV charging session, and (5) transmitting to a remote device a value representing the amount of energy transferred during the EV charging session.

In some embodiments, the first connector may be a J1772 (Type 1) connector, a CCS1 connector, a CHAdeMO connector, a Mennekes (Type 2) connector, a CCS2 connector, a GB/T connector, a Tesla connector, and/or the like. In further embodiments, the second connector may be a J1772 (Type 1) connector, a CCS1 connector, a CHAdeMO connector, a Mennekes (Type 2) connector, a CCS2 connector, a GB/T connector, a Tesla connector, and/or the like.

In some embodiments, the first connector may be a plug connector of a first type and the second connector may be a socket connector of the first type. In other embodiments, the first connector may be a socket connector of the first type and the second connector may be a plug connector of the first type.

In some embodiments, the communication interface may be a wireless personal area network (WPAN) interface. In further embodiments, the WPAN interface may be compliant to at least one version of a Bluetooth® standard.

In some embodiments, the communication interface may be a wireless local area network (WLAN) interface. In further embodiments, the WLAN interface may be compliant to at least one version of a Wi-Fi standard.

In some embodiments, the communication interface may be a wide area network (WAN) interface. In further embodiments, the WAN interface may be compliant to at least one version of at least a 2G standard, a 3G standard, a 4G standard, a 5G standard, and/or the like.

In some embodiments, the remote device may be a smart phone, a smart tablet, a smart watch, a personal computer, a smart TV, and/or the like.

In some embodiments, the remote device may be remote server. In further embodiments, the remote server may be a portion of a networked computing environment. In still further embodiments, the networked computing environment may be a cloud computing environment.

In some embodiments, the remote server may be a virtual server.

In some embodiments, the remote server may host a virtual container and the value representing the amount of energy transferred during the EV charging session may be received by an application executing within the virtual container.

In some embodiments, the controller may be further configured for synchronizing an apparatus time reference within a remote device time reference.

In some embodiments, the EV charger may be a home-based EV charger. In other embodiments, the EV charge may be a public EV charger.

In another embodiment, a method is implemented by a controller within an apparatus. The method includes (1) detecting a beginning of the EV charging session, (2) monitoring EV charging current and EV charging voltage during the EV charging session, (3) detecting an end of the EV charging session, (4) determining an amount of energy transferred during the EV charging session, and (5) transmitting to a remote device a value representing the amount of energy transferred during the EV charging session. The apparatus further includes a first connector configured for coupling with an EV charger, a second connector configured for coupling with a charging port of an EV, and a communication interface electrically coupled with the controller.

In another embodiment, a non-transitory computer-readable storage medium is disclosed. The non-transitory computer-readable storage medium stores instructions to be implemented by a controller within an apparatus. The instructions when executed by the controller perform a method. The method includes (1) detecting a beginning of an EV charging session, (2) monitoring EV charging current and EV charging voltage during the EV charging session, (3) detecting an end of the EV charging session, (4) determining an amount of energy transferred during the EV charging session, and (5) transmitting to a remote device a value representing the amount of energy transferred during the EV charging session. The apparatus further includes a first connector configured for coupling with an EV charger, a second connector configured for coupling with a charging port of an EV, and a communication interface electrically coupled with the controller.

In another embodiment, a method is implemented on a mobile client device. The method includes (1) receiving charging data associated with an EV charging session, (2) transmitting an amount of energy transferred during the EV charging session to a remote server, and (3) transmitting metadata associated with the amount of energy to the remote server.

In some embodiments, the metadata may identify that a least a portion of a cost of the amount of energy is a business-related expense for a user associated with the mobile client device, based on a selection made by the user from a graphical user interface (GUI) of the mobile client device. In other embodiments, the charging data may be provided by an apparatus configured for submetering the EV charging session and the metadata may identify that at least a portion of a cost of the amount of energy is a business-related expense for the user associated with the mobile client device, based on a unique identifier received from the apparatus. In further embodiments, the metadata may identify that at least a portion of a cost of the amount of energy is reimbursable to the user.

In some embodiments, the mobile client device may be configured for receiving the charging data over a first wireless network interface.

In some embodiments, the first wireless network interface may be a WPAN interface. In further embodiments, the WPAN interface may be compliant to at least one version of a Bluetooth® standard. In other embodiments, the first wireless network interface may be a WLAN interface. In further embodiments, the WLAN interface may be compliant to at least one version of a Wi-Fi standard.

In some embodiments, the mobile client device may be configured for transmitting the amount of energy and the metadata over a second wireless network interface.

In some embodiments, the second wireless network interface may be a WLAN interface. In further embodiments, the WLAN interface may be compliant to at least one version of a Wi-Fi standard. In other embodiments, the second wireless network interface may be a WAN interface. In still further embodiments, the WAN interface may be compliant to at least one version of a 2G standard, a 3G standard, a 4G standard, a 5G standard, or the like.

In some embodiments, the mobile client device may be a smart phone, a smart tablet, a smart watch, a laptop, or the like.

In some embodiments, the method may be provided by an application specific program executing on the mobile client device. In further embodiments, the application specific program may be an iOS® app, an Android® OS app, or the like.

In some embodiments, the charging data may be provided by an apparatus configured for submetering the EV charging session. The apparatus may include, a first connector configured for coupling with an EV charger, a second connector configured for coupling with a charging port of an EV, a communication interface, and a controller. The controller may be configured for (1) detecting a beginning of the EV charging session, (2) monitoring EV charging current and EV charging voltage during the EV charging session, (3) detecting an end of the EV charging session, (4) determining an amount of energy transferred during the EV charging session, and (5) transmitting to a remote device a value representing the amount of energy transferred during the EV charging session. In other embodiments, the apparatus may include a controller and a communication interface electrically coupled with the controller, wherein the controller is configured for (1) receiving from a remote device power data associated with the EV charging session, (2) determining an amount of energy transferred during the EV charging session based on the power data, and (3) transmitting to the mobile client device a value representing the amount of energy transferred during the EV charging session.

In some embodiments, the apparatus may be integrated with the EV charger. In other embodiments, the apparatus may be hardwired to monitor the EV charger. In certain embodiments, the apparatus may be compliant to the Directive 2004/22/EC of the European Parliament and of the Council of 31 Mar. 2004.41. In other embodiments, the apparatus may be integrated within the EV.

In some embodiments, the apparatus may provide a timestamp associated with the charging session.

In some embodiments, the method may further include requesting the charging data upon network detection of the apparatus and the apparatus may provide the charging data from non-volatile memory within the apparatus.

In some embodiments, the method may further include transmitting the amount of energy and the metadata to a printer based on a request received from a GUI of the mobile client device.

In some embodiments, the amount of energy and the metadata may be compliant to a Charge Detail Record (CDR). In further embodiments, the remote server may be associated with a Charge Point Operator (CPO). In still further embodiments, a protocol compliant to at least one version of an Open Charge Point Protocol (OCPP) may used for transmitting the amount of energy and the metadata.

In another embodiment, a mobile client device includes a GUI, a memory; and a processor. The processor is configured for (1) receiving charging data associated with an EV charging session, (2) transmitting an amount of energy transferred during the EV charging session to a remote server, and (3) transmitting metadata associated with the amount of energy to the remote server.

In another embodiment, a non-transitory computer-readable storage medium is disclosed. The non-transitory computer-readable storage medium stores instructions to be implemented by a processor within a mobile client device. The instructions when executed by the processor perform a method. The method includes (1) receiving charging data associated with an EV charging session, (2) transmitting an amount of energy transferred during the EV charging session to a remote server, and (3) transmitting metadata associated with the amount of energy to the remote server.

In another embodiment, an apparatus for submetering an EV charging session is disclosed. The apparatus includes a controller electrically coupled with a communication interface. The controller is configured for (1) receiving from a remote device power data associated with the EV charging session, (2) determining an amount of energy transferred during the EV charging session based on the power data, and (3) transmitting to a mobile client device a value representing the amount of energy transferred during the EV charging session.

In some embodiments, the remote device may be integrated with an EV charger. In other embodiments, the remote device may be hardwired to monitor the EV charger. In certain embodiments, the remote device may be compliant with the Directive 2004/22/EC of the European Parliament and of the Council of 31 Mar. 2004.

In another embodiment, a method is implemented by an apparatus for submetering an EV charging session. The method includes (1) receiving from a remote device power data associated with the EV charging session, (2) determining an amount of energy transferred during the EV charging session based on the power data, and (3) transmitting to a mobile client device a value representing the amount of energy transferred during the EV charging session. The apparatus includes a controller electrically coupled with a communication interface.

In another embodiment, a non-transitory computer-readable storage medium is disclosed. The non-transitory computer-readable storage medium stores instructions to be implemented by a controller within an apparatus. The instructions when executed by the controller perform a method. The method includes (1) receiving from a remote device power data associated with the EV charging session, (2) determining an amount of energy transferred during the EV charging session based on the power data, and (3) transmitting to a mobile client device a value representing the amount of energy transferred during the EV charging session. The apparatus includes a controller electrically coupled with a communication interface.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Disclosed herein are methods, systems, and devices for providing submetering of an electric vehicle (EV) charging session.

Figure 1:
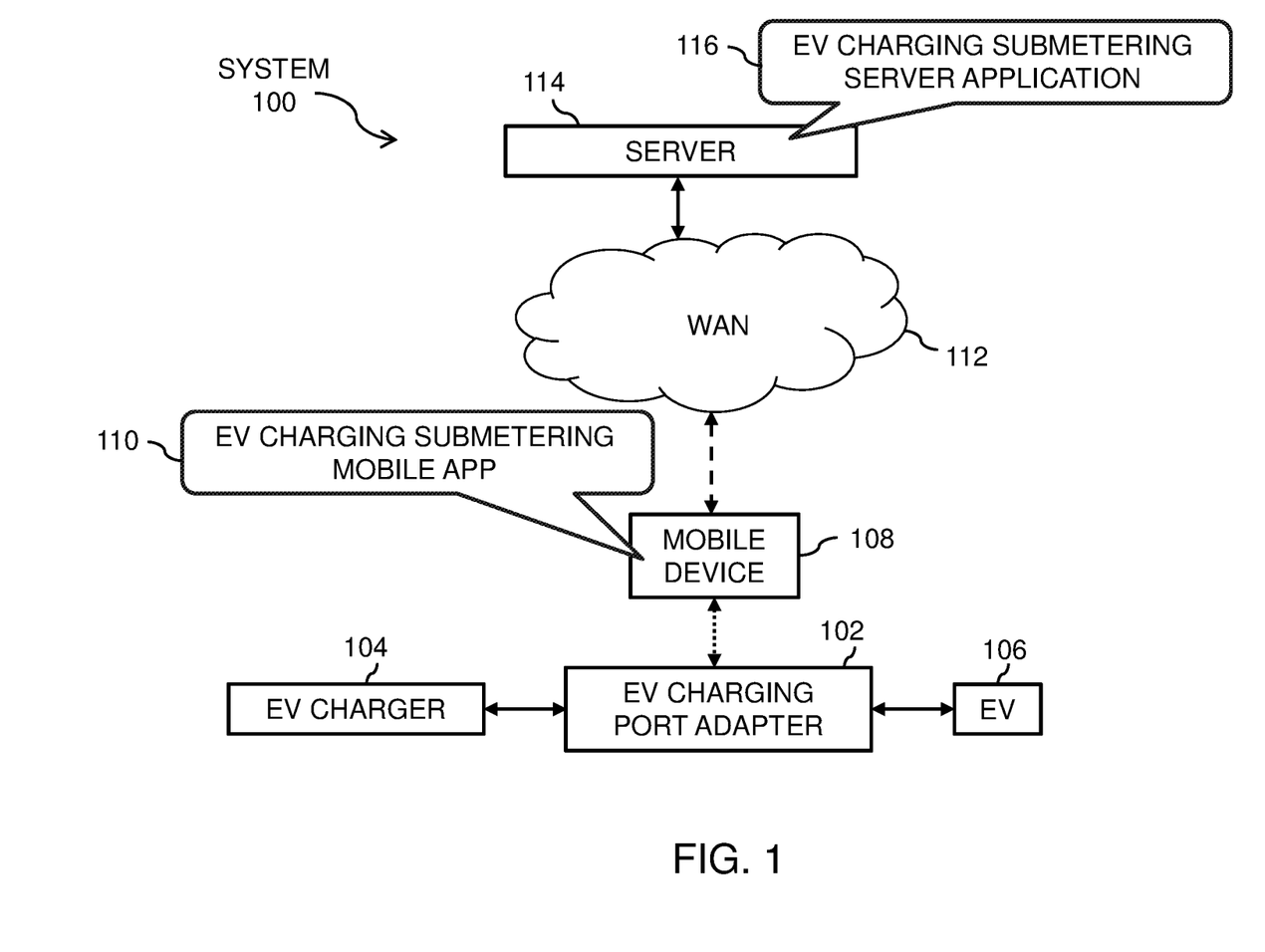
FIG. 1 depicts a system illustrating submetering of an electric vehicle (EV) in accordance with embodiments of the present disclosure

FIG. 1 depicts a system 100 illustrating submetering of an electric vehicle (EV) in accordance with embodiments of the present disclosure. An EV charging port adapter 102 is electrically coupled between an EV charger 104 and an EV 106. The EV charger 104 may be a home-based EV charger or a public EV charger. The EV charging port adapter 102 replicates an EV charging plug of the EV charger 104 for electrically and mechanically coupling with an EV charging socket of the EV 106. The EV charging port adapter 102 also replicates the EV charging socket of the EV 106 for electrically coupling with the EV charging plug of the EV charger 104. The EV charging socket and EV charging plug may be J1772 (Type 1) connectors, Combined Charging System Type 1 (CCS1) connectors, CHAdeMO connectors, Mennekes (Type 2) connectors, CCS2 connectors, GB/T connectors, Tesla connectors, or the like.

The EV charging port adapter 102 may be configured to be an extension cord to a cord of the EV charger 106 or as a replacement to the cord of the EV charger 106. The EV charging port adapter 102 may be configured to be coupled to the EV charging plug of the EV charger 104 in a semi-permanent arrangement. Alternately the EV charging port adapter 102 may be configured to be coupled to the EV charging socket of the EV 106 in a semi-permanent arrangement. In another scenario, the EV charging port adapter 102 may be configured to be coupled between a charging cord and a main unit housing the electronics of the EV charger 104. The EV charging port adapter 102 may also be hardwired in this scenario without using connectors.

The EV charging port adapter 102 is configured to communicate wirelessly with a mobile device 108 of a user. For example, a personal area network (PAN) may provide this communication (e.g., Bluetooth®). An EV charging submetering mobile application (app) 110 executing on the mobile device 108 is configured for monitoring power and/or energy usage during an EV charging session. The mobile device 108 is also configured to communicate wirelessly over a wide area network (WAN) 112 with a server 114. The WAN 112 may include the Internet. The EV charging submetering mobile app 110 is further configured for transmitting submetering data to an EV charging submetering server application 116 executing on the server 114. The EV charging submetering mobile app 110 may be an iOS® app, an Android®, or the like. The server 114 may be a portion of a networked computing environment and the networked computing environment may be a cloud computing environment. The server 114 may host a virtual container executing the EV charging submetering server application 116. In other embodiments, the server 114 may be a virtual server.

In one embodiment, the EV charging port adapter 102 measures the energy transferred from the EV charger 104 to the EV 106 during a charging session. If available, the EV charging port adapter 102 may be able to retrieve additional information from the EV 106 such as a Vehicle Identification Number (VIN). The additional information may be retrieved via the EV charging socket of the EV 106 and/or wirelessly from the EV 106. In another scenario the EV charging submetering mobile app 110 may wirelessly retrieve the additional information from the EV 106. The additional data may be made available by a standard application programming interface (API), such as the Smartcar® API. In addition to VIN, other information may include vehicle mileage, battery status, tire pressures, vehicle attributes, etc. The EV charging port adapter 102 may be configured to store the information (including energy transferred) in non-volatile memory when the EV charging submetering mobile app 110 is unavailable during a charging session (e.g., there is no network connectivity between the EV charging port adapter 102 and the mobile device 108, and/or the EV charging submetering mobile app 110 is not executing on the mobile device 108). Once connectivity is established between the EV charging port adapter 102 and the mobile device 108, and the EV charging submetering mobile app 110 is executing; the information associated with the charging session is transferred. In certain embodiments, the EV charging port adapter 102 may include a real time clock and apply a timestamp associated with the charging sessions. In other embodiments, the EV charging submetering mobile app 110 may provide the timestamp based on a real time clock within the mobile device 108.

In further embodiments, the EV charging port adapter 102 may be able to retrieve additional information from the EV charger 104 via the EV charging port adapter 102 and/or wirelessly. Additionally, the EV charging submetering mobile app 110 may wirelessly retrieve the additional information from the EV charger 104. The information may include an identifier associated with the EV charger 104. In certain embodiments, the information may be compliant to one or more specifications under International Organization for Standardization (ISO) 15118 for vehicle to grid (V2G) communication.

A user of the mobile device 108 and the EV charging submetering mobile app 110 may be able to mark a charging session for reimbursement and/or other category for future reference. The EV charging submetering mobile app 110 may further format the charging session information before transferring over the WAN 112 to the EV charging submetering server application 116 and/or other server application associated with EV charging and/or billing. The other server may be associated with a Charge Point Operator (CPO). The charging session information may be formatted as a charge detail record (CDR) or the like. The charging session information may also be transferred using an Open Charge Point Interface protocol (OCPI) or the like. Additionally, the EV charging submetering mobile app 110 may allow the user to print the charging information and/or save it as a personal file associated with the user.

In some embodiments, the EV charging port adapter 102 may be configured to communicate directly with the EV charging submetering server application 116 via a WAN interface and/or a local area network (LAN) interface built directly into the EV charging port adapter 102. The EV charging port adaptor 102 and/or EV charging submetering mobile app 110 may present itself as the EV charger 104 to the EV charging submetering server application 116. In one scenario, the system 100 would facilitate reimbursement for users who wish to charge their work vehicles at home. In another scenario, the system 100 would facilitate homeowners that may want to lease EV charging capabilities to other users.

Figure 2:
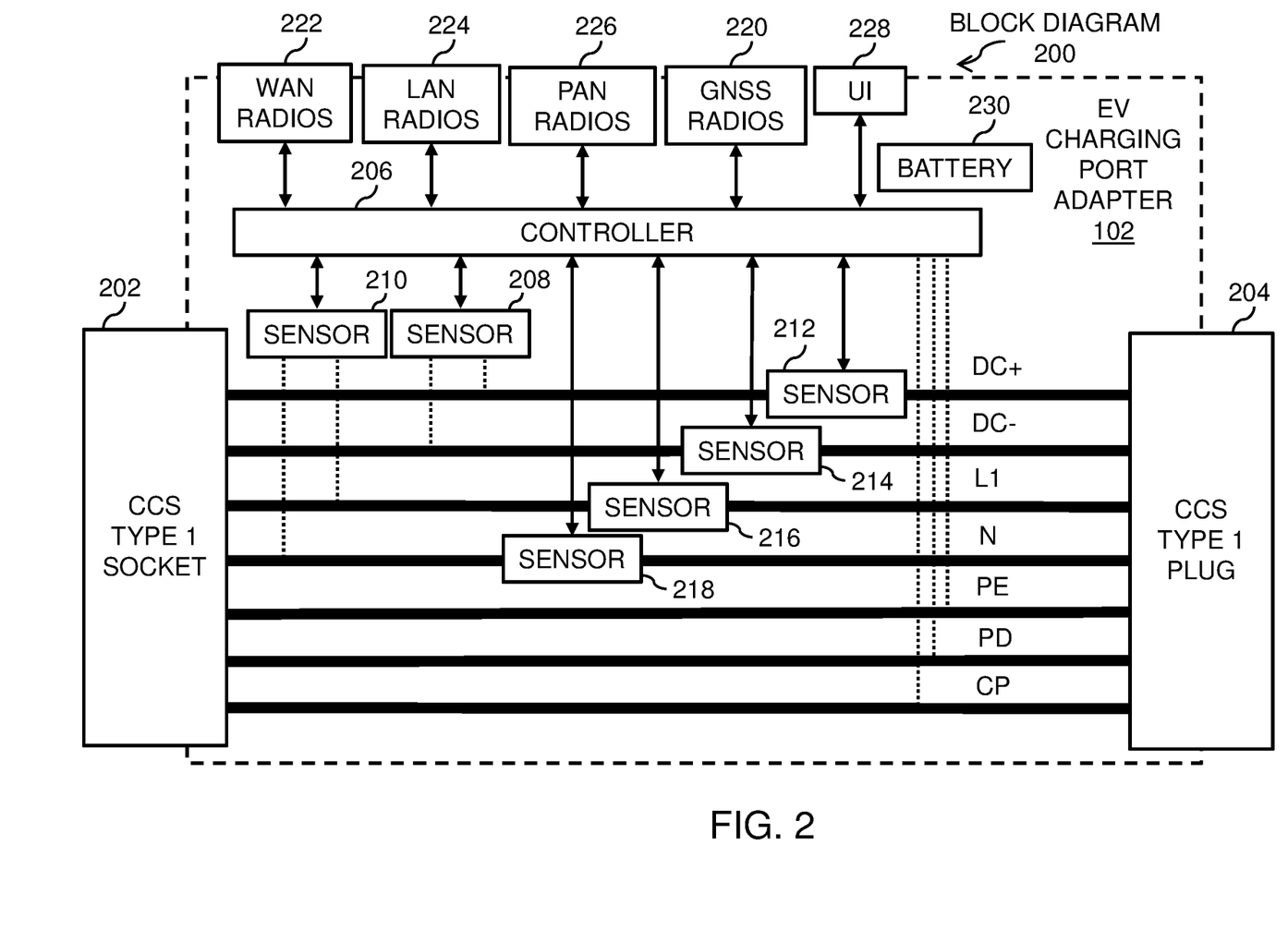
FIG. 2 depicts a block diagram illustrating one embodiment of an EV charging port adapter of the system of FIG. 1 in accordance with embodiments of the present disclosure.

FIG. 2 depicts a block diagram 200 illustrating one embodiment of the EV charging port adapter 102 of the system 100 of FIG. 1 in accordance with embodiments of the present disclosure. The EV charging port adapter 102 includes a Combined Charging System (CCS) Type 1 socket 202, a CCS Type 1 plug 204, a controller 206, sensors 208-218, global navigation satellite system (GNSS) radios 220, WAN radios 222, LAN radios 224, PAN radios 226, a user interface 228, and a battery 230.

The CCS Type 1 Socket is electrically coupled with the CCS Type 1 plug interconnecting neutral (N) pins, Line 1 (L1) pins, positive direct current (DC+) pins, negative DC (DC−) pins, control pilot (CP) pins, proximity detection (PD) pins, and protective earth (PE) pins. As such, the EV charging port adapter 102 is configured to plug transparently between EV charger 104 and the EV 106 while submetering energy transfer during an EV charging session.

The controller 206 may be an ultra-low-power microcontroller. For example, the controller 206 may be a Renesas® Synergy R7FS1JA783A01CFM Microcontroller Unit (MCU) or similar MCU. The R7FS1JA783A01CFM MCU is based on a 48 MHz Arm Cortex-M23 processor core with 256 kilobytes (KB) code flash, 32 KB static random access memory (SRAM) memory, and multiple analog-to-digital converters (ADCs) and digital-to-analog converters (DACs) for monitoring voltage and/or currents.

The GNSS radios 220 are used to determine a location of the EV charger 104. The WAN radios 222 may include 2G, 3G, 4G, and/or 5G technologies. The LAN radios 224 may include Wi-Fi technologies such as 802.11a, 802.11b/g/n, 802.11ac, 802.11.ax or the like circuitry. The PAN radios 226 may include Bluetooth® technologies. The UI 228 may include a liquid crystal display (LCD) and/or one or more switches. The LCD may be configured to display current power and/or current energy transfer completed during an EV charging session. Additionally, the LCD may be configured to display pairing and or connection of the WAN radios, LAN radios, and/or PAN radios. The sensor 208 is configured to measure a DC voltage provided by the EV charger 104. The sensor 210 is configured to measure an AC voltage provided by the EV charger 104. The sensors 212 and 214 are configured to measure DC current provided to the EV 106 from the EV charger 104. The sensors 216 and 218 are configured to measure AC current provided to the EV 106 from the EV charger 104. The controller 206 is also configured to monitor the PD pins and the CD pins during the EV charging session. The battery 230 is configured to power to the EV charging port adapter 102 when disconnected from the EV charger 104. A battery charger (not shown in FIG. 2) may be included to charge the battery 230 while the EV charging port adapter 102 is connected with the EV charger 104. In some embodiments, the battery 230 may not be included in the EV charging port adapter 102. The EV charging port adapter 102 may be solely powered by the EV charger 104 and the controller 206 wakes up when only connected with the EV charger 104. Additionally, the controller may store data in non-volatile memory as necessary for determining an amount of energy transferred during an EV charging session.

Figure 3:
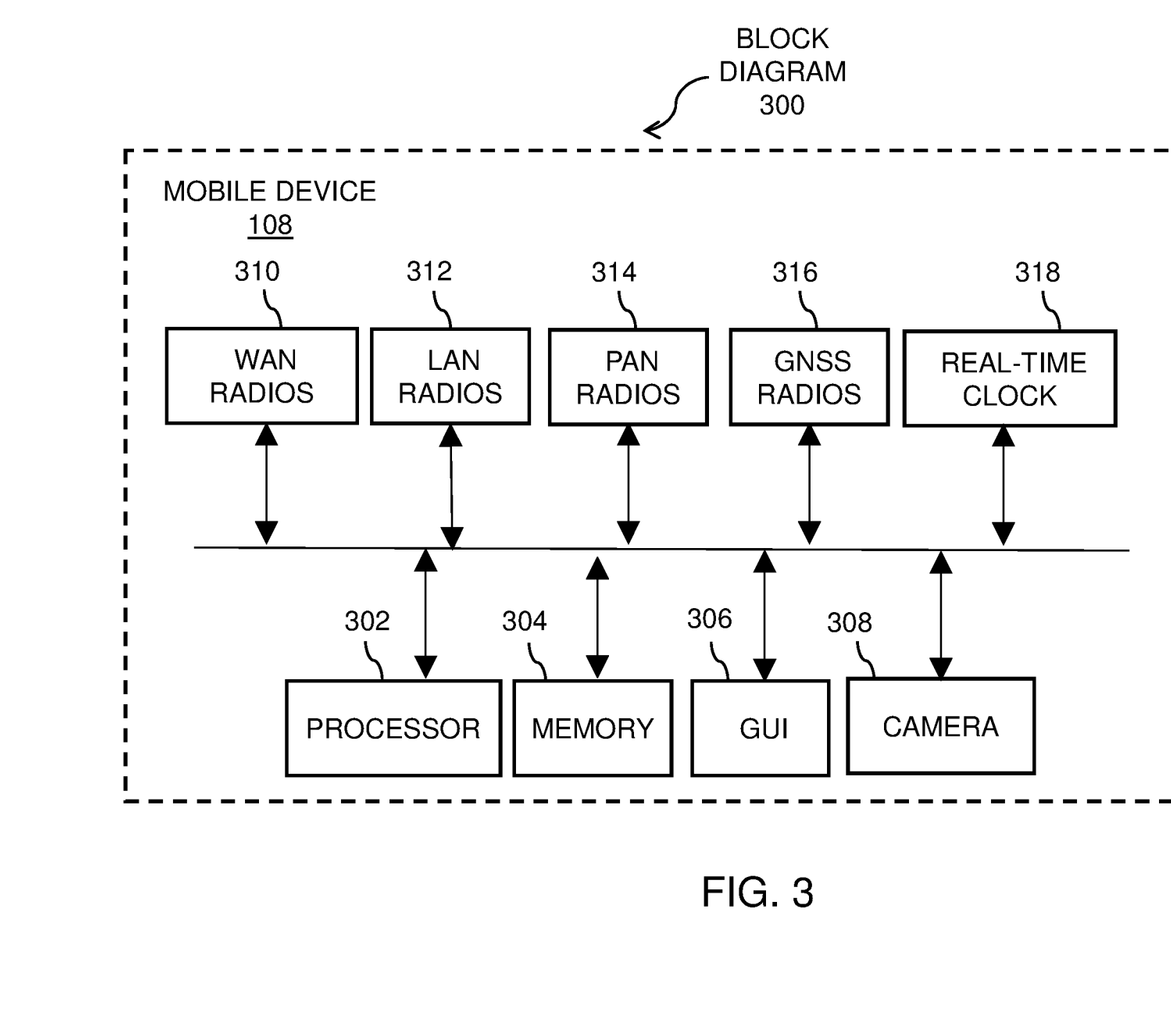
FIG. 3 depicts a block diagram illustrating a mobile device of the system of FIG. 1 in accordance with embodiments of the present disclosure.

FIG. 3 depicts a block diagram 300 illustrating the mobile device 108 of the system 100 of FIG. 1 in accordance with embodiments of the present disclosure. The mobile device 108 includes at least a processor 302, a memory 304, a graphical user interface (GUI) 306, a camera 308, WAN radios 310, LAN radios 312, and PAN radios 314.

In some embodiments, the processor 302 may be a mobile processor such as the Qualcomm® Snapdragon™ mobile processor. The memory 204 may include a combination of volatile memory (e.g., random access memory) and non-volatile memory (e.g. flash memory). The memory 304 may be partially integrated with the processor 302. The GUI 306 may be a touchpad display. The WAN radios 310 may include 2G, 3G, 4G, and/or 5G technologies. The LAN radios 312 may include Wi-Fi technologies such as 802.11a, 802.11b/g/n, 802.11ac, 802.11.ax or the like circuitry. The PAN radios 314 may include Bluetooth® technologies.

The mobile computing device 108 also includes GNSS radios 316 for determining current location data, and a real time clock 318 for synchronizing with a time reference of the EV charging port adapter 102. The camera 308 may be used to capture a barcode and/or quick response (QR) code of the EV charger 104.

Figure 4A:
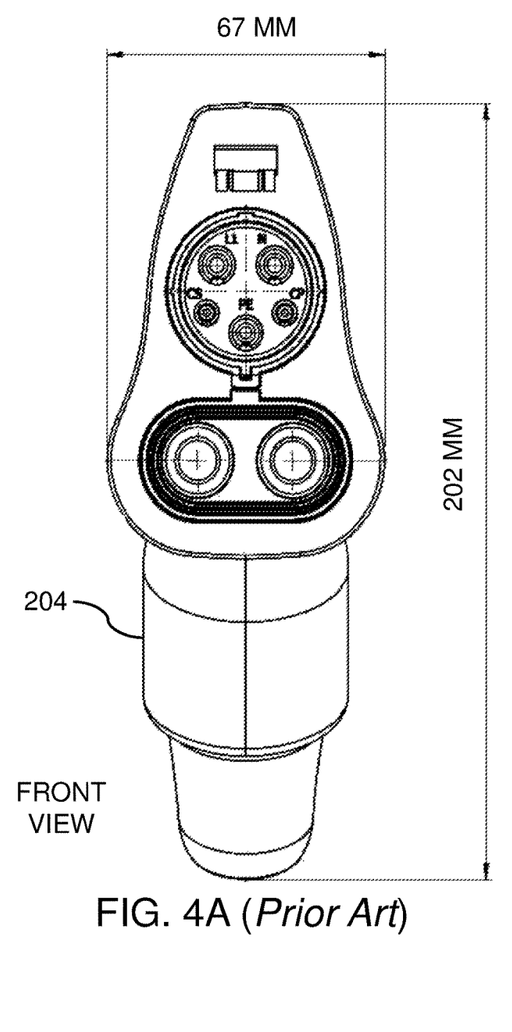
FIG. 4A depicts a mechanical diagram illustrating a front view of a Combined Charging System (CCS) Type 1 plug of FIG. 2 in accordance with embodiments of the present disclosure.

FIG. 4A depicts a mechanical diagram illustrating a front view of the CCS Type 1 plug 204 of FIG. 2 in accordance with embodiments of the present disclosure.

Figure 4B:
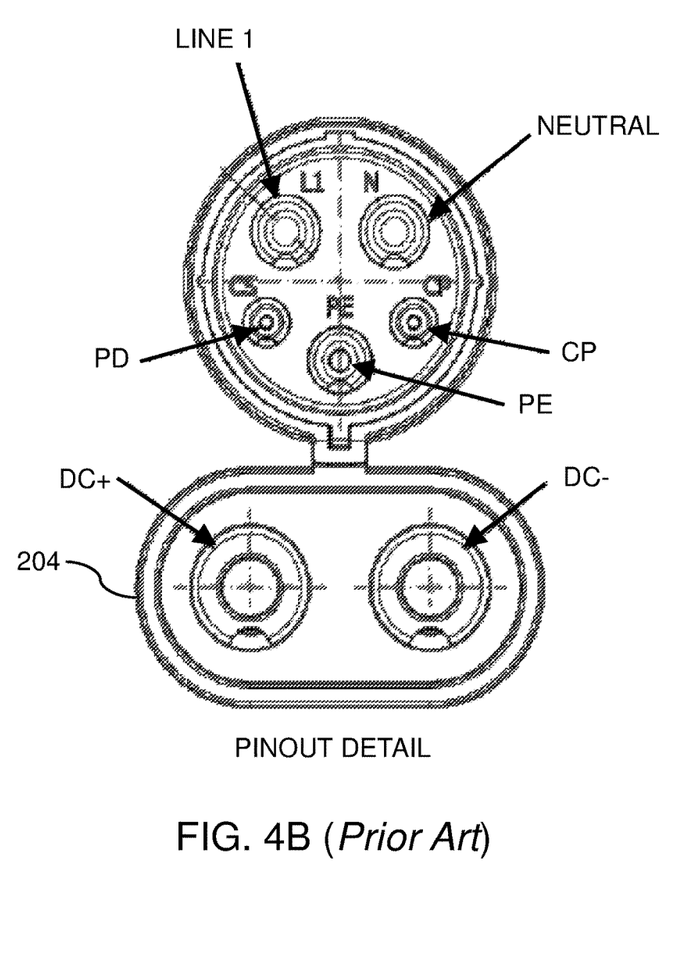
FIG. 4B depicts a mechanical diagram illustrating a pinout detail of the CCS Type 1 plug of FIG. 2 in accordance with embodiments of the present disclosure.

FIG. 4B depicts a mechanical diagram illustrating a pinout detail of the CCS Type 1 plug 204 of FIG. 2 in accordance with embodiments of the present disclosure.

Figure 4C:
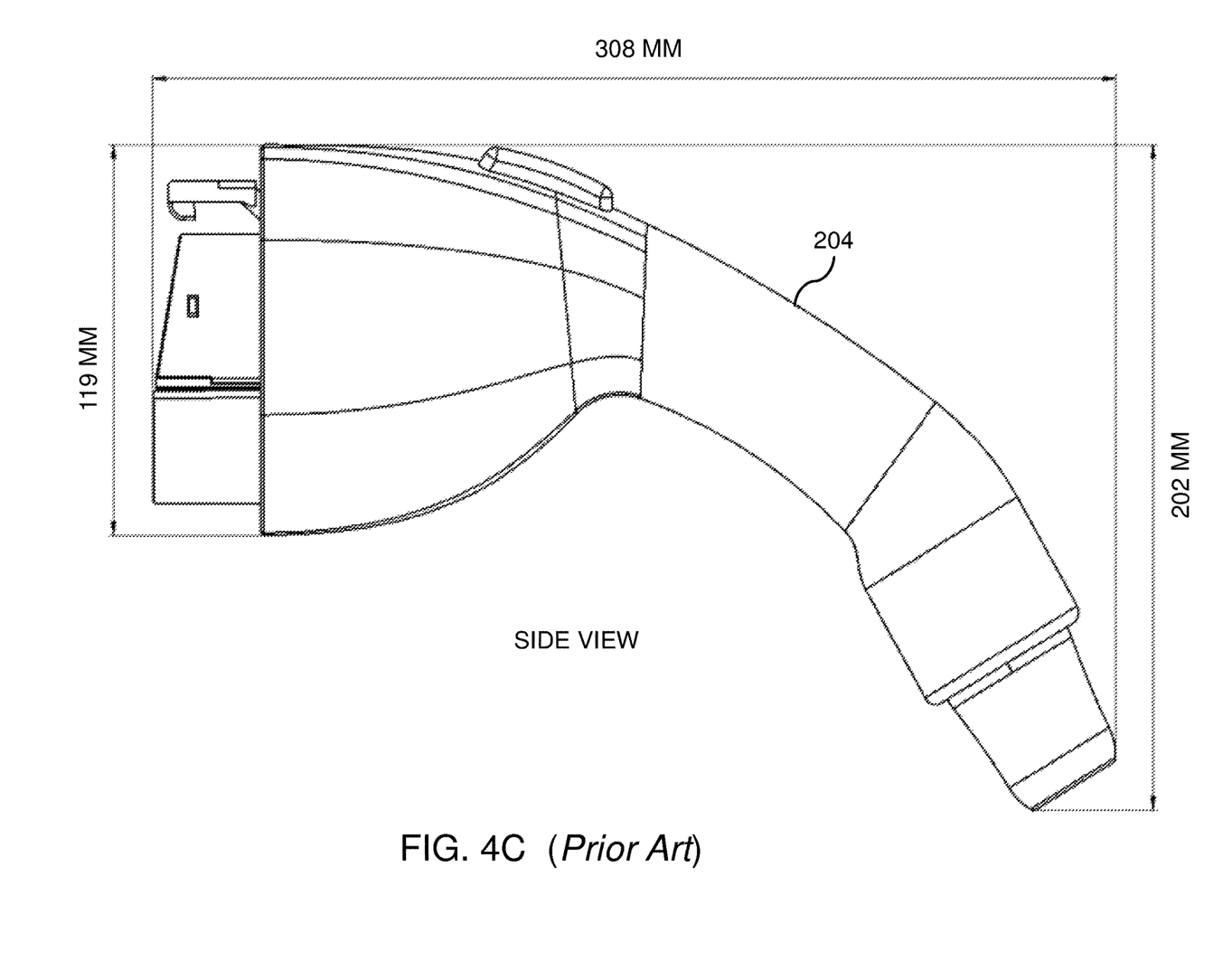
FIG. 4C depicts a mechanical diagram illustrating a side view of the CCS Type 1 plug of FIG. 2 in accordance with embodiments of the present disclosure.

FIG. 4C depicts a mechanical diagram illustrating a side view of the CCS Type 1 plug of FIG. 2 in accordance with embodiments of the present disclosure.

Figure 5:
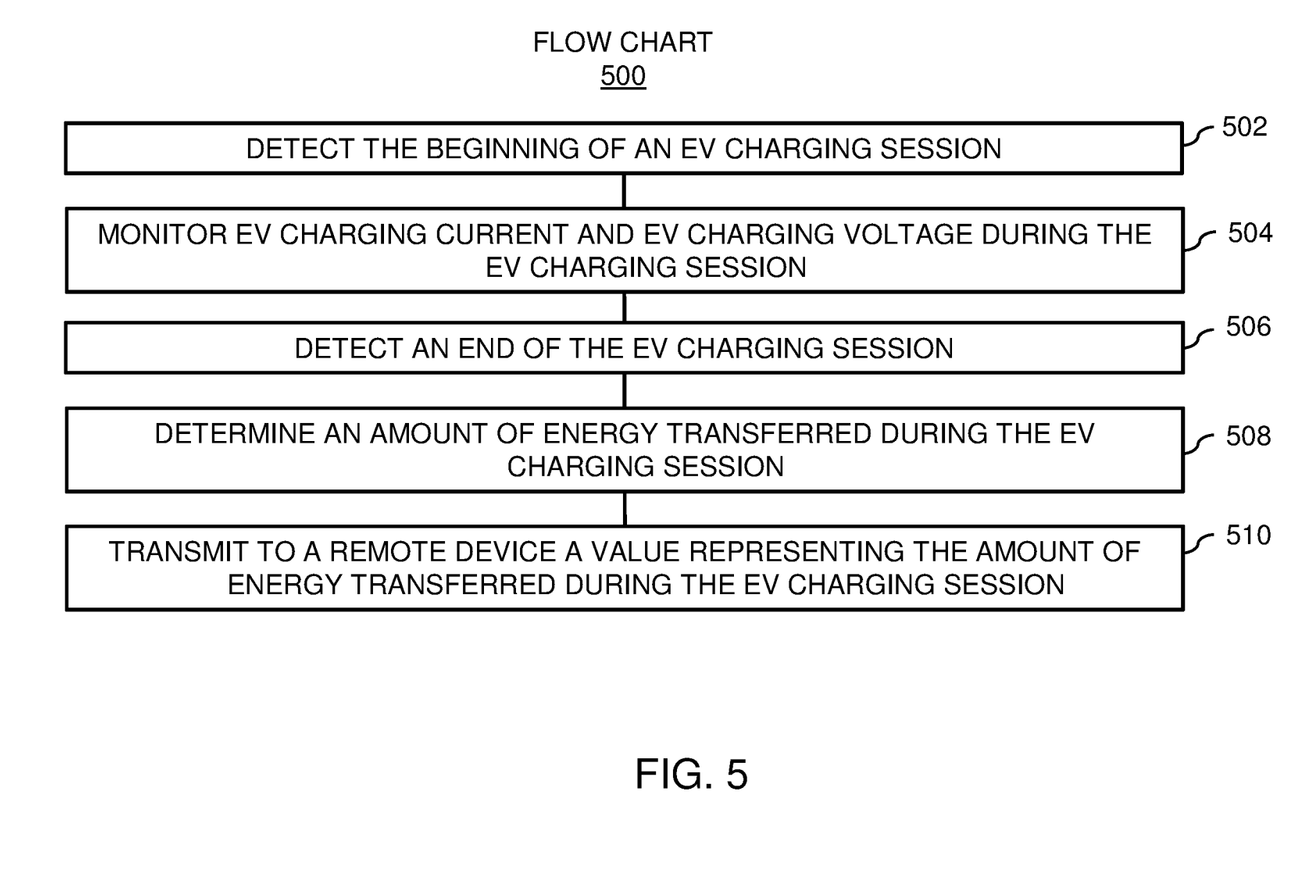
FIG. 5 depicts a flow chart for implementing a method on a controller within an apparatus for providing submetering of an EV charging session in accordance with embodiments of the present disclosure.

FIG. 5 depicts a flow chart 500 for implementing a method on a controller within an apparatus for providing submetering of an EV charging session in accordance with embodiments of the present disclosure. The apparatus may further include a first connector configured for coupling with an EV charger, a second connector configured for coupling with a charging port of an EV, and a communication interface electrically coupled with the controller. The first and second connectors may be J1772 (Type 1) connectors, CCS1 connectors, CHAdeMO connectors, Mennekes (Type 2) connectors, CCS2 connectors, GB/T connectors, Tesla connectors, and/or the like. The first connector may be a socket connector of a first type and the second connector may be a plug connector of the first type. Alternately, the first connector may be a plug connector of the first type and the second connector may be a socket connector of the first type.

In step 502, the method includes detecting the beginning of an EV charging session. Detecting the beginning of the EV charging session may include detecting a steep increase in EV charging current.

In step 504, the method further includes monitoring EV charging current and EV charging voltage during the EV charging session. The EV charging current may be monitored by one or more analog-to-digital converters (DACs) monitoring a voltage across a low value resistor placed in series between a DC output of the EV charger and a DC input of an EV charging port. Additionally, an AC current sensor may monitor AC current between an AC output of the EV charger and an AC input of the EV charging port. The EV charging voltage may be monitored by one or more DACs monitoring a voltage across the AC and/or DC output of the EV charger.

In step 506, the method further includes detecting an end of the EV charging session. Detecting the end of the charging session may include detecting a steep decline in EV charging current.

In step 508, the method further includes determining an amount of energy transferred to the EV during the EV charging session based on monitored current and monitored voltage between the beginning and the end of the EV charging session.

In step 510, the method further includes transmitting to a remote device via the communication interface a value representing the amount of energy transferred during the EV charging session. The value may be in Joules, watts-hours, British thermal units (BTUs), horsepower-hours, and/or the like.

Additionally (not shown in FIG. 5), the method may include storing the value representing the amount of energy transferred during the EV charging session in non-volatile memory until such a time that network connectivity is established with the remote device and then completing step 510.

Figure 6:
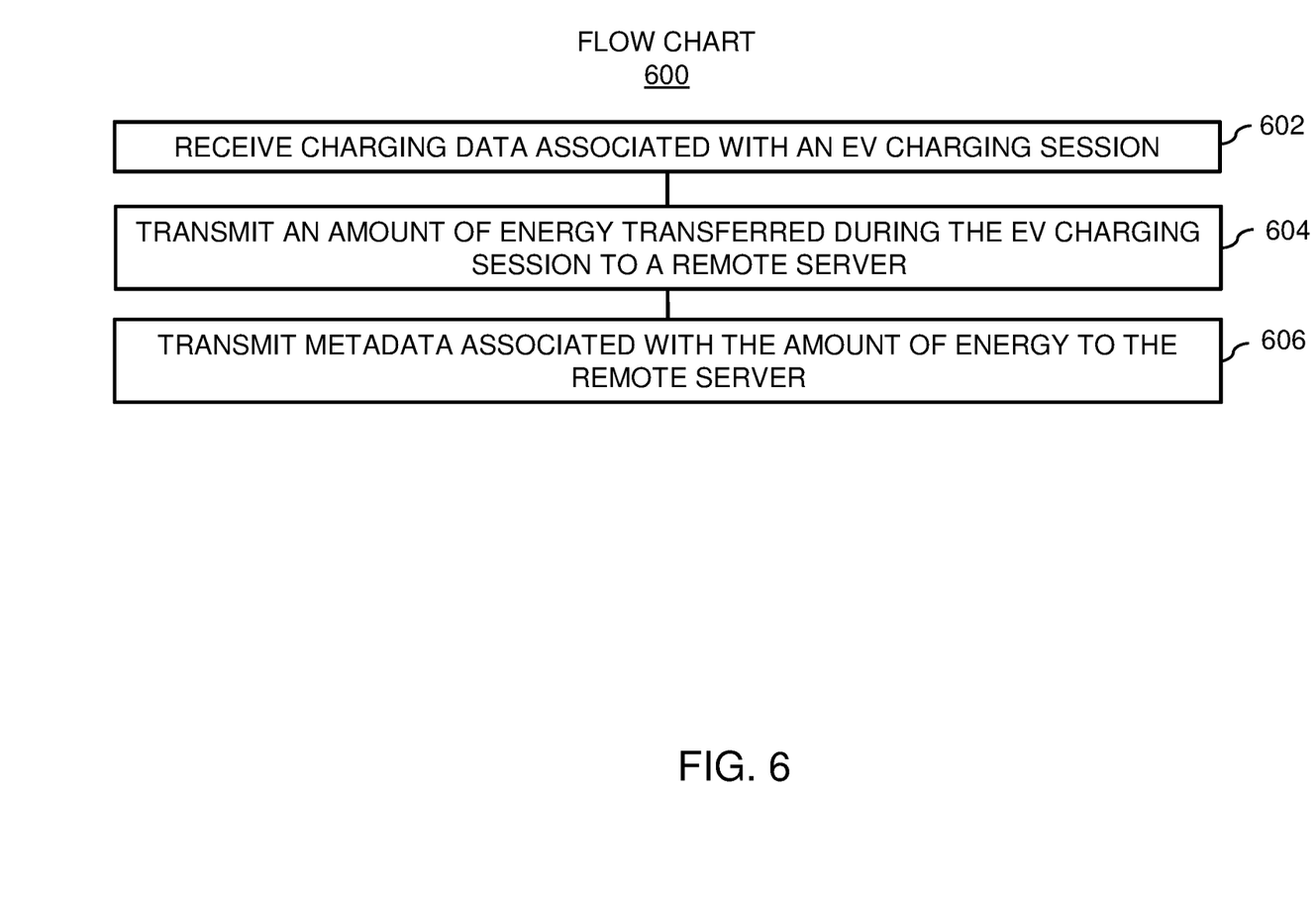
FIG. 6 depicts a flow chart for implementing a method on a mobile client device for facilitating submetering of an EV charging session in accordance with embodiments of the present disclosure.

FIG. 6 depicts a flow chart 600 for implementing a method on a mobile client device (e.g., the mobile device 108 of FIG. 1) for facilitating submetering of an EV charging session in accordance with embodiments of the present disclosure. The mobile client device may be a smart phone, a smart tablet, a smart watch, a laptop, or the like. The method may be provided by an application specific program executing on the mobile client device. Additionally, the application specific program may be an iOS® app, an Android® OS app, or the like.

In step 602, the method includes receiving charging data associated with an EV charging session. The mobile client device may be configured for receiving the charging data over a first wireless network interface. The first wireless network interface may be a WPAN interface. The WPAN interface may be compliant to at least one version of a Bluetooth® standard. Alternately, the first wireless network interface may be a WLAN interface. Additionally, the WLAN interface may be compliant to at least one version of a Wi-Fi standard.

The charging data may be provided by an apparatus configured for submetering the EV charging session. The apparatus may include, a first connector configured for coupling with an EV charger, a second connector configured for coupling with a charging port of an EV, a communication interface, and a controller. The controller may be configured for (1) detecting a beginning of the EV charging session, (2) monitoring EV charging current and EV charging voltage during the EV charging session, (3) detecting an end of the EV charging session, (4) determining an amount of energy transferred during the EV charging session, and (5) transmitting to a remote device a value representing the amount of energy transferred during the EV charging session. Alternately, the apparatus may include a controller and a communication interface electrically coupled with the controller, wherein the controller is configured for (1) receiving from a remote device power data associated with the EV charging session, (2) determining an amount of energy transferred during the EV charging session based on the power data, and (3) transmitting to the mobile client device a value representing the amount of energy transferred during the EV charging session. Additionally, the apparatus may provide a timestamp associated with the charging session.

The apparatus may be integrated with the EV charger. Alternatively, the apparatus may be hardwired to monitor the EV charger. In certain embodiments, the apparatus may be compliant to the Directive 2004/22/EC of the European Parliament and of the Council of 31 Mar. 2004.41. In other embodiments, the apparatus may be integrated within the EV.

In step 604, the method further includes transmitting an amount of energy transferred during the EV charging session to a remote server.

In step 606, the method further includes transmitting metadata associated with the amount of energy to the remote server. The metadata may identify that a least a portion of a cost of the amount of energy is a business-related expense for a user associated with the mobile client device, based on a selection made by the user from a graphical user interface (GUI) of the mobile client device. Alternatively, the charging data may be provided by an apparatus configured for submetering the EV charging session and the metadata may identify that at least a portion of a cost of the amount of energy is a business-related expense for the user associated with the mobile client device, based on a unique identifier received from the apparatus. Additionally, the metadata may identify that at least a portion of a cost of the amount of energy is reimbursable to the user.

The mobile client device may be configured for transmitting the amount of energy and the metadata over a second wireless network interface. The second wireless network interface may be a WLAN interface. Additionally, the WLAN interface may be compliant to at least one version of a Wi-Fi standard. In other embodiments, the second wireless network interface may be a WAN interface. Additionally, the WAN interface may be compliant to at least one version of a 2G standard, a 3G standard, a 4G standard, a 5G standard, or the like.

The method (not shown in FIG. 6) may further include requesting the charging data upon network detection of the apparatus and the apparatus may provide the charging data from non-volatile memory within the apparatus. Additionally, the method (not shown in FIG. 6) may further include transmitting the amount of energy and the metadata to a printer based on a request received from a GUI of the mobile client device.

The amount of energy and the metadata may be compliant to a Charge Detail Record (CDR). In further embodiments, the remote server may be associated with a Charge Point Operator (CPO). Additionally, a protocol compliant to at least one version of an Open Charge Point Protocol (OCPP) may be used for transmitting the amount of energy and the metadata.

Figure 7:
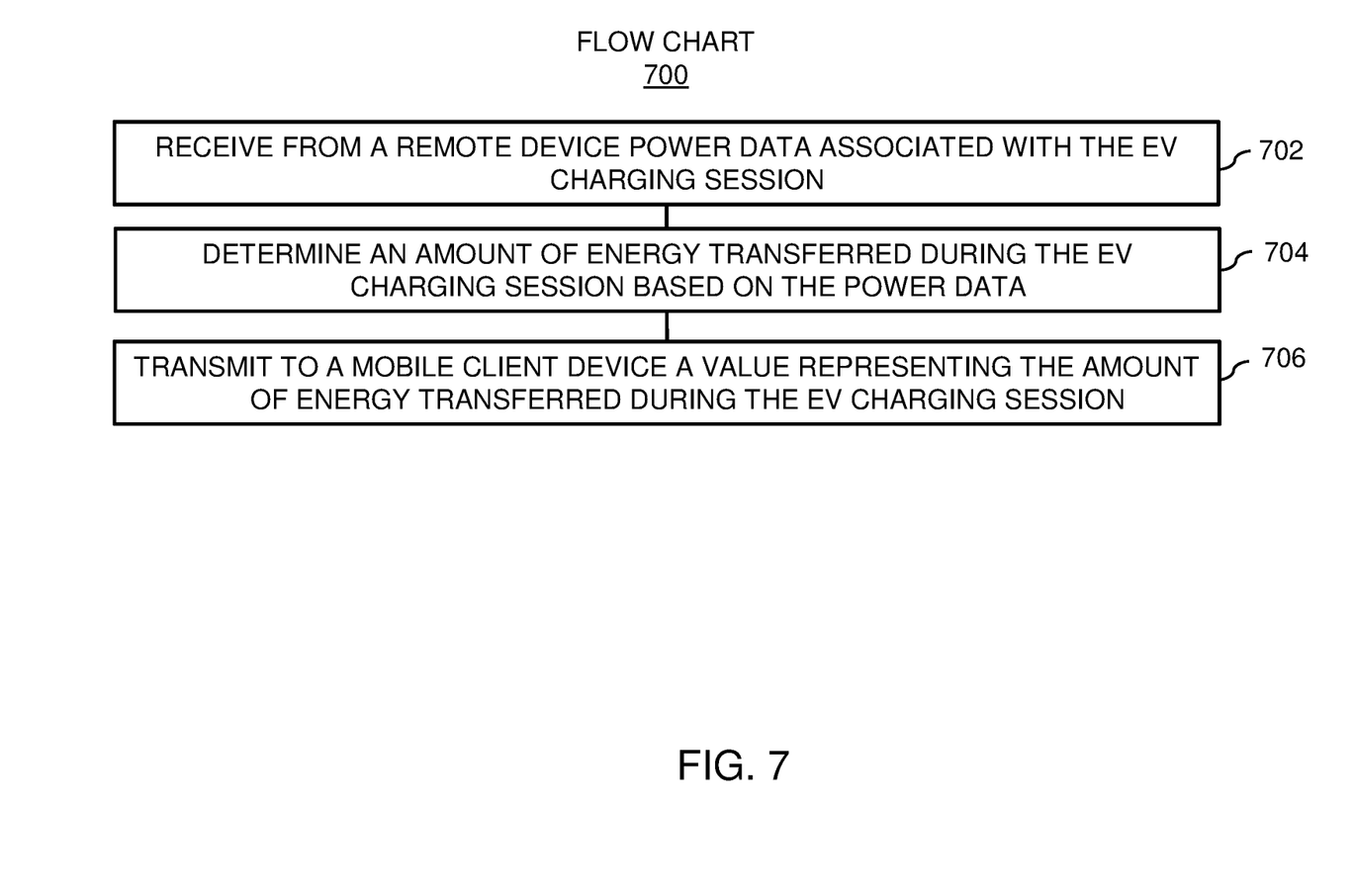
FIG. 7 depicts a flow chart for implementing another method on a controller within an apparatus for providing submetering of an EV charging session in accordance with embodiments of the present disclosure.

FIG. 7 depicts a flow chart 700 for implementing a method within an apparatus for providing submetering of an EV charging session in accordance with embodiments of the present disclosure. The apparatus includes a controller and a communication interface electrically coupled with the controller.

In step 702, the method includes receiving from a remote device power data associated with the EV charging session. The remote device may be integrated with an EV charger. Alternatively, the remote device may be hardwired to monitor the EV charger. Additionally, the remote device may be compliant to the Directive 2004/22/EC of the European Parliament and of the Council of 31 Mar. 2004.

In step 704, the method further includes determining an amount of energy transferred during the EV charging session based on the power data.

In step 706, the method further includes transmitting to a mobile client device a value representing the amount of energy transferred during the EV charging session. The mobile device may be similar to the mobile device 108 of FIG. 3.

Figure 8:
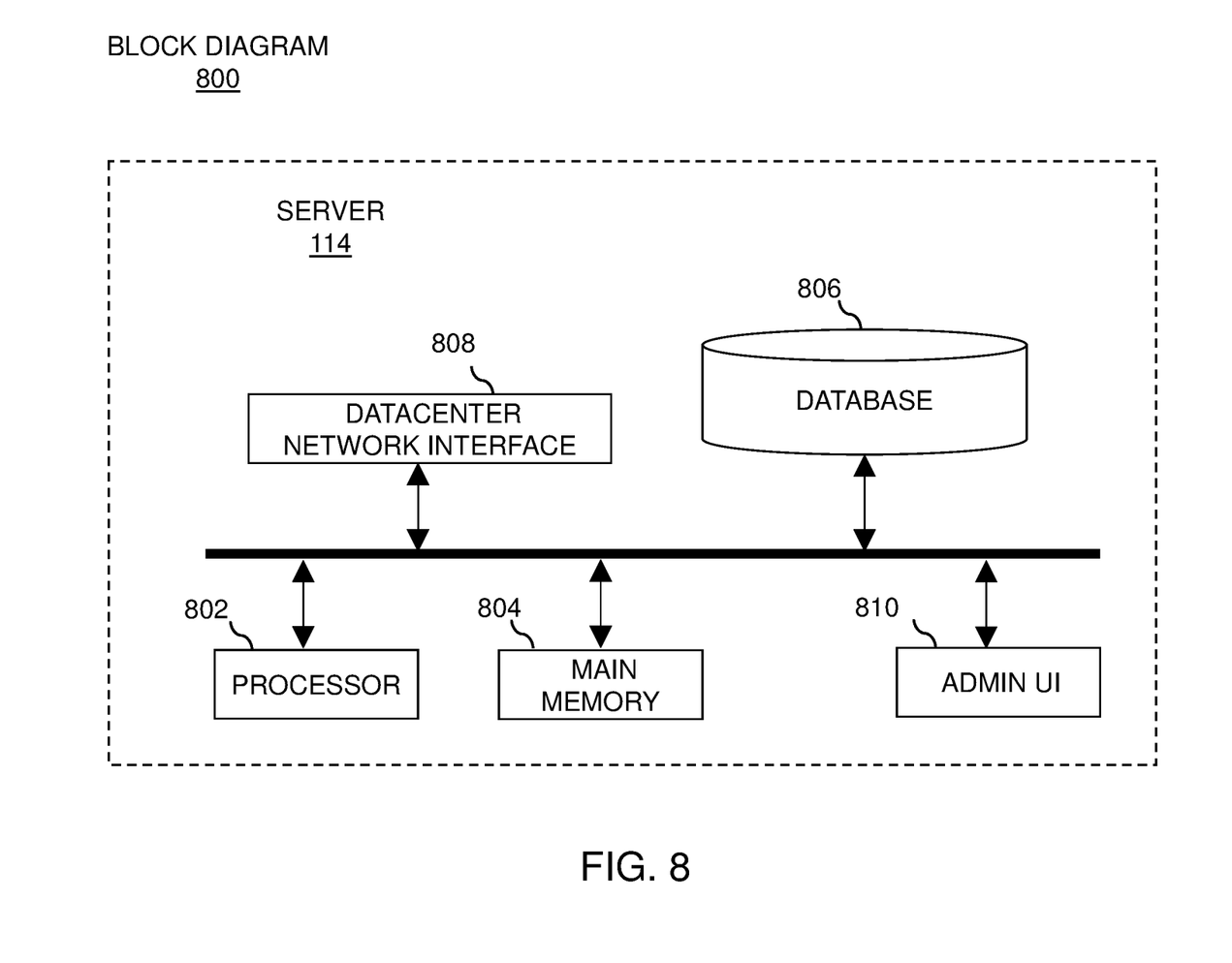
FIG. 8 depicts a block diagram illustrating a server of FIG. 1 in accordance with embodiments of the present disclosure.

FIG. 8 depicts a block diagram 800 illustrating the server 114 of FIG. 1 in accordance with embodiments of the present disclosure. The server 114 includes a processor 802, a main memory 804, a storage memory (e.g., database) 806, a datacenter network interface 808, and an administration user interface (UI) 810. The server 114 may be configured to host at least a portion of an Ubuntu® server. In some embodiments Ubuntu® server may be distributed over a plurality of hardware servers using hypervisor technology.

The processor 802 may be a multi-core server class processor suitable for hardware virtualization. The processor may support at least a 64-bit architecture and a single instruction multiple data (SIMD) instruction set. The main memory 804 may include a combination of volatile memory (e.g., random access memory) and non-volatile memory (e.g., flash memory). The database 806 may include one or more hard drives.

The datacenter network interface 808 may provide one or more high-speed communication ports to the data center switches, routers, and/or network storage appliances. The datacenter network interface 808 may include high-speed optical Ethernet, InfiniBand (IB), Internet Small Computer System Interface (iSCSI), and/or Fibre Channel interfaces. The administration UI may support local and/or remote configuration of the server 114 by a datacenter administrator.

Figure 9:
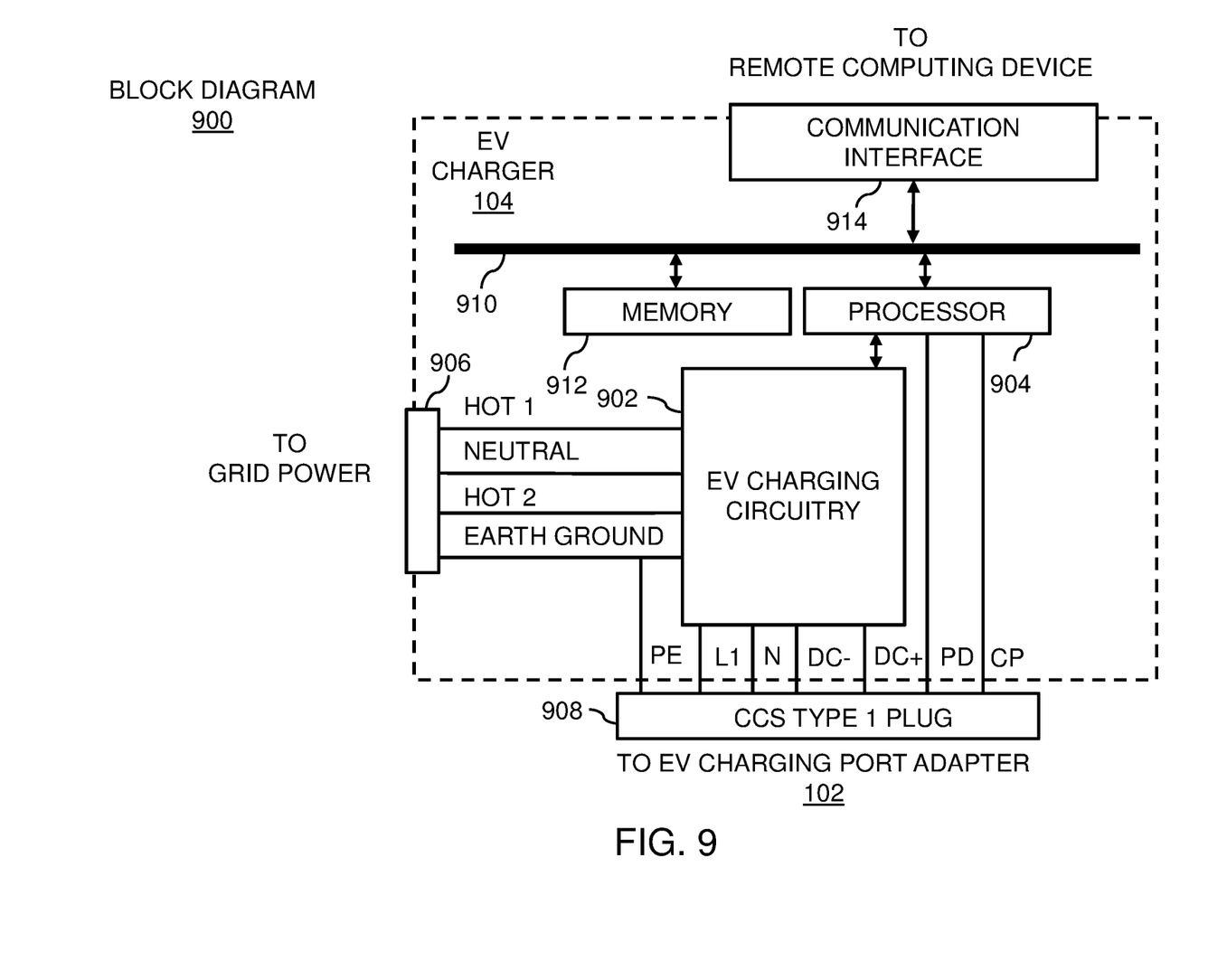
FIG. 9 depicts a block diagram illustrating an EV charger of FIG. 1 in accordance with embodiments of the present disclosure.

FIG. 9 depicts a block diagram 900 illustrating the EV charger 104 of FIG. 1 in accordance with embodiments of the present disclosure. The EV charger 104 may be a home-based EV charger or a public EV charger. The EV charger 104 includes EV charging circuitry 902 and a processor 904. The EV charger 104 also includes an electrical interface 906 for connecting to a power grid. The electrical interface 906 includes electrical connections for Grid Hot 1, Grid Hot 2, Grid Neutral, and earth ground as a split-phase grid connection as is commonly known in the art.

The EV charger 104 also includes an electrical interface 908 for electrically coupling the EV charging port adaptor 102 of FIG. 1. The electrical interface 908 may be compliant with a Combined Charging System (CCS) Type 1 connection.

The processor 904 is configured to monitor a Proximity Detection (PD) contact to confirm connection to the EV 106 via the EV charging port adaptor 102. The processor 904 is further configured to monitor a control pilot (CP) contact to maintain a charging rate within a safe operating limit of the EV 106. The EV charging circuitry 902 is configured to provide AC power to the electrical interface 908. The EV charging circuitry 902 includes switch circuitry for enabling and/or disabling AC power to the electrical interface 908 via a first AC (L1) contact and a second AC (N) contact. The L1 contact and the N contact provide AC power to internal charging circuitry within the EV 106. The switch circuitry may include a relay and the relay may be a solid-state relay. The EV charging circuitry 902 may also include an AC-to-DC rectifier for providing DC power to the electrical interface 908 via a DC+ contact and a DC− contact. The DC+ contact and the DC− contact provide charging current to the battery pack of the EV 106 in this scenario.

An address/data bus 910 communicatively couples the processor 904 with a memory 912. In some embodiments, the memory 912 or a portion of the memory 912 may be integrated with the processor 904. The memory 912 may include a combination of volatile memory and non-volatile memory. In some embodiments the processor 904 and the memory 912 may be embedded in a microcontroller.

The address/data bus 910 also communicatively couples the processor 904 with a communication interface 914. The communication interface 614 may be communicatively coupled with the one or more remote communication devices that support billing for usage of the EV charger 104. The communication interface 914 may be a wired communication interface or a wireless communication interface. The communication interface 914 may be a LAN interface or a PAN interface. The LAN interface may include an Ethernet interface and/or wireless LAN interfaces such as Wi-Fi (e.g., 802.11a, 802.11b/g/n, and/or 802.11ac circuitry). The PAN interface may be a Bluetooth® interface, a Universal Serial Bus (USB®) interface, or the like. The communication interface 914 may be an external bus interface (EBI), a controller area network (CAN) bus interface, or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for submetering an electric vehicle (EV) charging session, the apparatus comprising:
   a first connector configured for coupling with an EV charger;
   a second connector configured for coupling with a charging port of an EV; and
   a controller electrically coupled with the first connector; and
   a communication interface electrically coupled with the controller, wherein the controller is configured for:
      detecting a beginning of the EV charging session;
      monitoring EV charging current and EV charging voltage during the EV charging session;
      detecting an end of the EV charging session;
      determining an amount of energy transferred during the EV charging session; and
      transmitting to a mobile client device a value representing the amount of energy transferred during the EV charging session via the communication interface, wherein the mobile client device configured for:
         receiving charging data from the apparatus, and the charging data includes the value representing the amount of energy;
         transmitting the amount of energy transferred during the EV charging session to a remote server; and
         transmitting metadata associated with the amount of energy to the remote server, wherein the metadata identifies that at least a portion of a cost of the amount of energy is a business-related expense for a user associated with the mobile client device, based on a selection made by the user from a graphical user interface (GUI) of the mobile client device.

2. The apparatus of claim 1, wherein:
   the first connector is at least one of a J1772 (Type 1) connector, a CCS1 connector, a CHAdeMO connector, a Mennekes (Type 2) connector, a CCS2 connector, a GB/T connector, or a Tesla connector; and
   the second connector is at least one of a J1772 (Type 1) connector, a CCS1 connector, a CHAdeMO connector, a Mennekes (Type 2) connector, a CCS2 connector, a GB/T connector, or a Tesla connector.

3. The apparatus of claim 1, wherein the first connector is a plug connector of a first type and the second connector is a socket connector of the first type.

4. The apparatus of claim 1, wherein the first connector is a socket connector of a first type and the second connector is a plug connector of the first type.

5. The apparatus of claim 1, wherein the communication interface is at least one of a wireless personal area network (WPAN) interface or a wireless local area network (WLAN) interface.

6. The apparatus of claim 1, wherein the communication interface is a wide area network (WAN) interface.

7. The apparatus of claim 1, wherein the mobile client device is at least one of a smart phone, a smart tablet, or a smart watch.

8. The apparatus of claim 1, wherein the remote server is a portion of a networked computing environment.

9. The apparatus of claim 1, wherein the controller is further configured for synchronizing an apparatus time reference within a mobile client device time reference.

10. The apparatus of claim 1, wherein the EV charger is a home-based EV charger.

11. The apparatus of claim 1, wherein the EV charger is a public EV charger.

12. The apparatus of claim 1, wherein the mobile client device is further configured for requesting the charging data upon network detection of the apparatus and the apparatus provides the charging data from non-volatile memory within the apparatus.

13. The apparatus of claim 1, wherein the amount of energy and the metadata are compliant to a Charge Detail Record (CDR).

14. The apparatus of claim 1, wherein the remote server is associated with a Charge Point Operator (CPO).

15. The apparatus of claim 1, wherein a protocol compliant to at least one version of an Open Charge Point Protocol (OCPP) is used for transmitting the amount of energy and the metadata.

16. The apparatus of claim 1, wherein the metadata includes a timestamp.

17. The apparatus of claim 1, wherein:
the communication interface is a wireless personal area network interface; and
the mobile client device is further configured to transmit the metadata over at least one of a wireless wide area network (WAN) interface or a local area network (LAN) interface.

18. The apparatus of claim 1, wherein the mobile client device is further configured for transmitting the amount of energy and the metadata to a printer based on a request received from a graphical user interface (GUI) of the mobile client device.

19. A method implemented by an apparatus for submetering an electric vehicle (EV) charging session, the method comprising:
detecting a beginning of an electric vehicle (EV) charging session;
monitoring EV charging current and EV charging voltage during the EV charging session;
detecting an end of the EV charging session;
determining an amount of energy transferred during the EV charging session; and
transmitting to a mobile client device a value representing the amount of energy transferred during the EV charging session, wherein the apparatus comprises:
a first connector configured for coupling with an EV charger;
a second connector configured for coupling with a charging port of an EV;
a controller electrically coupled with the first connector; and
a communication interface electrically coupled with the controller, wherein the mobile client device configured for:
receiving charging data from the apparatus, and the charging data includes the value representing the amount of energy;
transmitting the amount of energy transferred during the EV charging session to a remote server; and
transmitting metadata associated with the amount of energy to a remote server, wherein the metadata identifies that at least a portion of a cost of the amount of energy is a business-related expense for a user associated with the mobile client device, based on a selection made by the user from a graphical user interface (GUI) of the mobile client device.

20. A non-transitory computer-readable storage medium, the non-transitory computer-readable storage medium storing instructions to be implemented by a controller within an apparatus, the instructions when executed by the controller perform a method of:
detecting a beginning of an electric vehicle (EV) charging session;
monitoring EV charging current and EV charging voltage during the EV charging session;
detecting an end of the EV charging session;
determining an amount of energy transferred during the EV charging session; and
transmitting to a mobile client device a value representing the amount of energy transferred during the EV charging session, wherein the apparatus further comprises:
a first connector configured for coupling with an EV charger;
a second connector configured for coupling with a charging port of an EV;
a controller electrically coupled with the first connector; and
a communication interface electrically coupled with the controller, wherein the mobile client device configured for:
receiving charging data from the apparatus, and the charging data includes the value representing the amount of energy;
transmitting the amount of energy transferred during the EV charging session to a remote server; and
transmitting metadata associated with the amount of energy to a remote server, wherein the metadata identifies that at least a portion of a cost of the amount of energy is a business-related expense for a user associated with the mobile client device, based on a selection made by the user from a graphical user interface (GUI) of the mobile client device.

* * * * *